United States Patent [19]

Styron

[11] Patent Number: 4,624,711

[45] Date of Patent: Nov. 25, 1986

[54] LIGHT-WEIGHT AGGREGATE

[75] Inventor: Robert W. Styron, Marietta, Ga.

[73] Assignee: Resource Technology, Inc., Tucker, Ga.

[21] Appl. No.: 669,284

[22] Filed: Nov. 7, 1984

[51] Int. Cl.$^4$ .............................................. C04B 14/00
[52] U.S. Cl. ................................ 106/308 S; 106/122; 106/DIG. 1
[58] Field of Search .......... 106/308 B, 308 S, DIG. 1, 106/122

[56] References Cited

U.S. PATENT DOCUMENTS

| | | | |
|---|---|---|---|
| 2,987,411 | 6/1961 | Minnick | 106/122 |
| 3,141,857 | 7/1964 | Sommer | 106/122 |
| 3,814,614 | 6/1974 | Kraemer et al. | 106/97 |
| 4,321,243 | 3/1982 | Cornwell et al. | 423/268 |
| 4,429,456 | 1/1984 | Gillott et al. | 106/287.32 |
| 4,501,830 | 2/1985 | Miller et al. | 523/401 |

Primary Examiner—Amelia B. Yarbrough
Attorney, Agent, or Firm—Killworth, Gottman, Hagan & Schaeff

[57] ABSTRACT

A light-weight aggregate, for use in production of light-weight structural products, composed of a self-hardening fly ash, a surfactant foam, and optionally an accelerator and additives. The self-hardening fly ash is preferably class C fly ash formed by the combustion of sub-bituminous coal from the Power River Basin. The surfactant foam is preferably an anionic sulfate surfactant foam. The accelerator is preferably an extract of silica fume dust. The additives may include magnesium and boron compounds, other fly ashes, light-weight fillers, polymers, cement and magnesium silicate and like materials.

16 Claims, No Drawings

LIGHT-WEIGHT AGGREGATE

BACKGROUND OF THE INVENTION

The present invention relates to light-weight concrete products and more particuarly it relates to a light-weight foamed aggregate for use in the production of light-weight structural products.

Approximately ¾ of the volume of conventional concrete is occupied by aggregates consisting of such materials as sand, gravel, crushed rock, or air-cooled blast-furnace slag. It is inevitable that a constituent occupying such a large percentage of the mass should contribute important properties to both the plastic and hardened product. Additionally, in order to develop special light-weight, thermal and acoustical characteristics, aggregates manufactured specifically to develop these properties in concrete are employed. These aggregates may occupy less than ¾ of the volume in structural concrete and more than ¾ of the volume in masonry units and other applications.

When concrete is freshly mixed, the aggregates really are suspended in the cement-water-air bubble paste. Behavior of this suspension (i.e., the fresh, plastic concrete), for instance, ease of placement without segregation causing rock pockets or sand streaks, is importantly influenced by selection of the amount, type and size gradation of the aggregate. Depending upon the nature of the aggregates employed, a fairly precise balance between the amount of fine-and-coarse-sized fractions may have to be maintained to achieve the desired mobility, plasticity, and freedom from segregation, all lumped under the general term "workability." Selection of mixture proportions is aimed to achieve optimum behavior of the desired properties.

Aggregates contribute many qualities to the hardened concrete. The strength-giving binding material holding concrete together results from the chemical union of the mixing water and cement and is, of course, the basic ingredient. However, this hardened cement-water-air bubble paste would, by itself, be a very unsatisfactory building material due to its high cost and volume shrinkage. The paste subsequent to initial hardening, unless restrained by contained aggregates, undergoes an intolerable amount of shrinkage upon drying. The exposed portions of such pastes dry out first, and differential shrinkage between the outside and inside portions often results in cracking. The presence of aggregates provides an enormous contact area for intimate bond between the paste and aggregate surfaces. Rigidity of the aggregates greatly restrains volume change of the whole mass. The aggregates should also contribute to workability, volume, stability, unit weight, resistance to destructive environment, strength, and present an acceptable surface texture.

Satisfactory concrete has been made with aggregate consisting of particles of a great variety of individual shapes. Natural aggregate particles which have been subjected to wave and water action over geologic history may be essentially spherical; others broken by crushing may be cubical or highly angular with sharp corners. Of interest to the concrete technologist is that such changes in shape will be influential in altering the void characterics of the aggregate. A highly angular coarse aggregate possessing large void content will demand a greater amount of sand to provide a workable concrete. Conversely, a well-rounded coarse aggregate tending toward spherical particles will require less sand. Thus a rounded aggregate may contribute to better workability in a concrete mix. It is interesting to note, however, that concretes made with a great disparity in particle shapes at a given cement content will frequently have about the same compressive strength.

As such, it would be desirable to have light-weight, nearly spherical aggregate compatible with concrete which still retains all of the strength characteristics of natural aggregate particles. Of course, there are naturally occurring "light-weight aggregates," and efforts to develop artificial ones have been made.

"Lightweight aggregates" of various types have been used for many years, but it is only in the last twenty years that they have become an important factor in the concrete construction industry. Both mineral (inorganic) and vegetable (organic) materials of many varieties have been considered and tested for use as light-weight aggregates. The inorganic or mineral materials are the only ones that have been used to any significant extent.

Various methods have been used to classify light-weight aggregates into general types. These are frequently based on original source as either natural or artificial materials. The artificial aggregates are either by-products of an industrial operation or specially processed by calcining, expanding, or sintering. In this classification system, such materials as pumice, scoria, and tuff are natural aggregates; by-product materials include cinders, bottom-ash, and processed by-products. Processed light-weight aggregates may also be produced from clay, shale, slate, perlite, vermiculite, blast furnace slag, and fly ash. Some of the materials may be placed in more than one type of the groups. For example, pumice may be used either in its original natural state or after heat processing (calcining); blast furnace slag and fly ash are by-products that have herefore been processed for use as light-weight aggregates by expanding and sintering, respectively; clays, shales, and slates are natural materials that are always heat processed during production of light-weight aggregates.

There are basically three A.S.T.M. (American Society for Testing Materials) specifications that cover light-weight aggregates. These specifications are as follows:
1. A.S.T.M. C-330, "Lightweight Aggregates For Structural Concrete."
2. A.S.T.M. C-331, "Lightweight Aggregates For Concrete Masonry Units."
3. A.S.T.M. C-332, "Lightweight Aggregates for Insulating Concrete."

Of course, it is known that use of such light-weight aggregates, either natural or artificial, produces a "light-weight concrete." Concrete lighter in weight than that usually obtained with "normal weight" aggregates (gravel and crushed stone) and may be produced in the same manner as conventional concrete except for the use of light-weight aggregates.

It is also known that light-weight concrete may be produced by adding other light-weight materials such as light-weight structural foam. See, for example, U.S. Pat. Nos. 4,373,955, 4,097,422, 3,983,081, and 3,758,319, which disclose various types of light-weight foamed concretes.

Finally, Kraemer Pat. Nos. 4,142,910 and 3,814,614 disclose light construction concretes including light-weight inorganic admixtures compatible with concrete, which admixtures are foamed or bloated to be approximately spherical or ellipsoidal shaped. The admixtures of the Kramer patents include foamed alkali metal silicate glass, foam glass granulates, and expanded or bloated clay. The Kraemer patents, among others, are discussed in the chapter entitled, "Lightweight and Foam Products" in *Cement and Mortar Technology and Additives*, Noyes Data Corp., Park Ridge, N.J. 1980.

While the admixtures of Kraemer have the advantage of producing a light-weight concrete having a dry density of less than about 0.9 kg/dm$^3$ and a 28-day compressive strength of up to about 120 kg/cm$^2$, the foaming or blowing procedure for such inorganic glasses is difficult, requires high temperatures, and can be costly.

Accordingly, the need exists for a more efficient means for producing a lower cost light-weight artificial aggregate.

SUMMARY OF THE INVENTION

The present invention meets that need by providing an artificial aggregate which is essentially spherical or ellipsoidal, which is light-weight, which is compatible in cement and water mixtures, which has sufficient physical properties to meet the ASTM specifications for light-weight aggregates and which is easy to produce at low cost.

The light-weight aggregate of the present invention is essentially a hardened agglomerated mixture of a self-hardening fly ash, such as class C fly ash, a surfactant foam, and optionally an accelerator and additives.

"Class C fly ash" is described in U.S. Pat. No. 4,226,630, which is incorporated by reference herein. It is formed in the construction of sub-bituminous coal from the Powder River Basin of Wyoming and Idaho and is well known for its hydraulic properties. Class C fly ash may be mixed with other fly ashes such as class F fly ash. Fillers such as incinerated sewage sludge, diamotaceous earth, fullers earth, kaolin, kiln dust (cement and lime), perlite, pyrophyllite, talc and ground vermiculite may also be added to reduce unit weight. Other additives such as ground polyethylene or like polymers and cement, magnesium silicate or like materials may also be added.

The surfactant foam may be produced by the introduction of air under pressure into a liquid surfactant, preferably a sulfate surfactant. It may be an anionic, cationic, or nonionic surfactant, but anionic surfactant in the form of ammonium or calcium salts of sulfate surfactants are preferred. A non-wetting agent, such as glycerin or mineral oil, may be added to help prevent the surfactant foam from collapsing when added to the class C fly ash.

An accelerator may also be added to help prevent collapse of the surfactant foam, or conversely to induce sufficiently rapid hardening of the class C fly ash so that the surfactant foam does not have time to collapse before the agglomeration is formed. While known chloride-cure accelerators can be used, the preferred accelerator is an extract of silica fume dust. The accelerator may be either added to the fly ash-surfactant foam mixture, such as by spraying it into the mixture as it is agglomerated in a tumbling agglomerator, or it may be added to the surfactant prior to foaming.

Following agglomeration, the pelletized formed aggregates may be fired at around 1800° F. to enhance pellet strength. Alternatively, when ground polyethylene is used as an additive, the aggregate may be heat treated at 300° F. or less to fuse the polyethylene, thus avoiding the need for firing. As yet another alternative when cement or magnesium silicate or like material is added to the aggregate, no heat treatment is required at all since the reaction mixture is exothermic in nature. In any event, the resulting light-weight aggregates have a weight density of 40 lbs./Ft.$^3$ to 80 lbs./Ft.$^3$.

The light-weight aggregate of the present invention is particularly suited for use in concrete, masonry blocks, brick, roofing squares, roofing tiles, pipe, pre-cast products, grouts, and similar types of building products. It may be used with fly ash, foam, cement, water, natural aggregates, or combinations thereof producing light-weight structural products. Particularly desirable is a concrete composition containing a pozzolanic material (i.e. cement, self-hardening fly ash, etc.), water, and the light-weight aggregate of the present invention; although, other aggregates such as limestone aggregates, sand, gravel, slag, clay, diatomite, lime, lime kiln dust, and cement kiln dust can be included.

The resulting structural product is light-weight and yet has sufficient compressive strength to meet most building requirements. Concrete products as prepared have been found to have a 1-day compressive strength of 450 to 1100 psi and a 7-day compressive strength of 1100 to 2200 psi.

Accordingly, it is an object of the present invention to provide a novel light-weight foamed aggregate, to provide a method for producing that aggregate, and to provide a light-weight structural composition containing a pozzolanic material, water, and the light-weight aggregate of the present invention.

DETAILED DESCRIPTION OF THE PREFERRED EMBODIMENTS

The preferred composition of the light-weight aggregate of the present invention is by weight as follows:
50 parts to 86 parts self hardening fly ash, and more preferably 65 parts to 80 parts,
1 part to 14 parts surfactant foam, and more preferably 10 parts to 14 parts,
0 to 6 parts accelerator, and more preferably 0.5 parts to 3.9 parts, and
0 to 30 parts additive.

The additives may include compounds, such as magnesium and boron compounds, to lower the fusion point during firing. Likewise, the additive may be a light-weight filler which, in addition to the foam, further reduces the weight of the aggregate. Small amounts of cement or magnesium silicate may also be added. Further, ground polyethylene or other polymers may be added for low temperature hardening of the aggregate.

As mentioned, the self hardening fly ash may be a class C. Class C fly ash will ordinarily be such that less than about 34% is retained on a 325 mesh sieve (U.S. series) as tested on ASTM Test Procedure C-311. It may typically show the following components on analysis:

| Components | Proportion |
| --- | --- |
| SiO$_2$ | 20-40 wt. % |
| Al$_2$O$_3$ | 10-30 |
| Fe$_2$O$_3$ | 3-10 |
| MgO | .5-8 |
| SO$_3$ | 1-8 |
| TiO$_2$ | .5-2 |
| C | .5-2 |
| H$_2$O | .33-3 |
| CaO | 10-32 |
| K$_2$O | .5-4 |

| Components | Proportion |
| --- | --- |
| Ni$_2$O | .5-6 |

The surfactant foam is produced preferably from an ammonium or calcium salt of a sulfate surfactant. Examples are: ammonium alkyl ether sulfate, ammonium salts of ethoxylate sulfate, calcium alkylaryl sulfonate, ammonium lauryl sulfate, monoethanolamine lauryl sulfate, diethanolamine lauryl sulfate, triethanolamine lauryl sulfate, isopropanolamine lauryl sulfate, ammonium lauryl ether sulfate, diethanolamine lauryl ether sulfate, isopropylamine salt of alkyl benzene sulfonic acid, amine or ammonium salts of dodecyl benzene sulfonic acid, ammonium salts of oxidized oleic acid, ammonium salts of sulfated nonyl-phenol ethoxylate, calcium dodecyl benzene sulfonate, ammonium myristyl ether sulfate, ammonium myristyl sulfate, triamine lauryl sulfate, alkanol amino lauryl sulfate, acyl amino polyglycol ether sulfate.

Preferred among these is ammonium salts of dodecyl benzene sulfonic acid. It is theorized that the receptive sulfate ion enhances the class C fly ash strength gaining properties by reacting to form an alkali sulfate.

Added to the sulfate surfactant may be a small amount i.e., 0.10 parts to 3 parts weight percent, of a non-wetting agent such as glycerin, mineral oil or mixtures thereof. As mentioned, the non-wetting agent is added to stabilize the foam and reduce its tendency to collapse while being folded in with the fly ash.

The sulfate surfactant/non-wetting agent mixture in water (i.e. 0.5-3% surfactant/non-wetting agent, remainder water) is foamed using a foam generator which is capable of introducing air under pressure (i.e. from a compressor, for example) in the range of 0-150 psi. The resulting foam is added to the self hardening fly ash at the rate of 1 to 14, and more preferably 10-14 parts per hundred. If the light-weight aggregate is fired, then, a greater amount of surfactant foam may be used without any deleterious effects. The accelerator may either be added to the foam at this stage or it may be added later during the agglomeration process.

The accelerator may be of a conventional chloride cure accelerator type (see, for example, U.S. Pat. No. 3,983,081), but is preferably a unique extract of silica fume dust especially developed for present purposes. That extract is produced by mixing silica fume dust with water, raising the pH to between approximately 10-12, settling for several days and collecting the supernatant (which is estimated to be between 25-50% of the originally added silica fume dust). The extract of silica fume dust proves to be an excellent accelerator for portland cement and other pozzolanic materials. In particular, it rapidly accelerates the set of class C self-hardening fly ash. A preservative, i.e., germacide, may be added to the extract to lengthen its shelf-life.

Again, it is theorized that the use of an accelerator speeds up the hardening of the fly ash to a sufficient degree that initially set, agglomerated pellets are formed before the surfactant foam collapses to any significant extent.

The preferred method for addition of the accelerator is to spray it into the fly ash/foam mixture as that mixture is being agglomerated. Agglomeration may take place in any conventional tumbling agglomerator (see pages 8-61 to 8-64 of Perry's *Chemical Engineers' Handbook*, 5th Ed., McGraw-Hill Book Company, N.Y., N.Y.). Preferred is a disk or pan agglomerator, also referred to herein as a pan pelletizer, adapted for addition of the surfactant foam through a central applicator for gentle folding in with the other ingredients.

It is, thus, possible to add foam directly from the foam generator to the pan pelletizer as fly ash from a bin is being separately added and the accelerator is being sprayed into the mixture. Preferably the foam is added to the mix at the rate of 0.001 Ft$^3$/min to fly ash which is being placed in the pan pelletizer at the rate of 1.66 lbs./min. If accelerator is to be sprayed into the mixture, this should also be done continuously, preferably at the rate of 0.001 gals./min. This continuous process is capable of producing particles of varying sizes. The pellets formed in the pan pelletizer may vary from 1½ screen size to 200 mesh in size. After formation it is desirable to fire them at approximately 1800° F. to enhance pellet strength. As mentioned, products such as magnesium and boron may be added to the light-weight aggregate to lower the fusion point.

The resulting light-weight aggregate particles have a weight density of 40 lbs. to 80 lbs./Ft$^3$. They have been found to meet the requirements of ASTM C-330, C-331 and C-332. As such, the light-weight aggregate of the present invention may be used as would other artificial or natural light-weight aggregates. They are especially suited for use in production of structural products.

Thus, foamed panels can be prepared using the light-weight aggregates of the present invention, more surfactant foam, and self-hardening fly ash. Cement may also be added. Blocks, bricks, railroad ties, pipes, roofing tiles and squares, and other precast products may be made from the same mixtures. Likewise, cast-in-place structures may also be produced with the surfactant foam, light-weight aggregate of the present invention, fly ash and/or cement. Concrete products prepared utilizing the light-weight aggregate of the present invention may have a 1-day compressive strength of 450 to 1100 psi and a 28-day compressive strength of 1800 to 4000 psi.

The following non-limiting examples are illustrative.

EXAMPLE I

A surfactant foam was prepared from a mixture of 1% Stepan Agent 9993-4, an ammonium salt of dodecyl benzene sulfonic acid from Stepan Chemical Co., in water.

In a pan pelletizer, light-weight aggregate was made utilizing 86 parts class C fly ash and 14 parts of the prepared foam.

Following hardening, the pellets were checked for gradation as follows:

|  | % Passing | ASTMC-331 Fine | ½-¼ ASTMC-331 Coarse | ½-0 ASTMC-331 Combined |
| --- | --- | --- | --- | --- |
| ¾ | | — | 100 | 100 |
| ½ | | — | 90-100 | 95-100 |
| ⅜ | 100 | 100 | 40-80 | — |
| #4 | 99.2 | 85-100 | 0-20 | 50-80 |
| #8 | 75.5 | — | 0-10 | — |
| #16 | 45.2 | 40-80 | — | — |
| #50 | 14.0 | 10-35 | — | 5-20 |
| #100 | 11.0 | 5-25 | — | 5-15 |
| Pan | | — | — | — |

Moisture: .61%
Unit Weight: 56 lbs/Ft$^3$
Organic Impurities: Nil

EXAMPLE II

The light-weight aggregate of Example I and the foam of Example I were used to produce structural articles as follows:

A. Roofing type panels (light-weight) 24" square were made using the following mixture:
500 parts Class C Fly Ash
1315 parts Light-weight aggregate of Example I
0.014 parts Foam from Example I.
Top of square surface coated with light-weight aggregate of Example I:
Compressive strength: 950 psi
Considered adequate Gen. Roofing tile squares.

B. Spanish tile-type roofing tile made using the following mixture:
500 parts Class C Fly Ash
1350 parts Light-weight aggregate from Example I
70 parts Foam from Example I.
Compressive Strength: 750 psi.

C. Flagstones
500 parts Class C Fly Ash
1200 parts Light-weight aggregate from Example I
70 parts Foam from Example I.
Compressive Strength: 640 psi.

D. Concrete Block
i.
16 lbs Light-weight aggregate (from Ex. I)
4 lbs City of Atlanta Ash (incinerated sewage sludge—unit weight of 36 lbs/ft$^3$)
2 lbs Water and foam (from Example I)
Unit Weight: 22 lbs.
ii.
17 lbs Light-weight aggregate (from Ex. I)
6 lbs Sand
4 lbs Cement and foam
Unit Weight: 27 lbs.
iii.
19 lbs Light-weight aggregate (from Ex. I)
4 lbs Sand
3 lbs granite fines
4 lbs Cement
Water and Foam (from Example I)
Unit Weight: 33 lbs.

EXAMPLE III

The light-weight aggregate of Example I was used, along with other ingredients as follows, to prepare test 4 inch cylinders for compressive strength testing:
2000 gms light-weight aggregate from example I
1000 gms sand
800 gms cement.

The cylinder weight was 1200 gms and the compressive strength was 1440 psi.

While the methods, compositions and products herein described constitute preferred embodiments of the invention, it is to be understood that the invention is not limited to these precise methods, compositions and products, and that changes may be made in either without departing from the scope of the invention, which is defined in the appended claims.

What is claimed is:

1. A light-weight aggregate comprising a pellitized agglomerated mixture of by weight 50 to 86 parts self-hardening fly ash formed in the combustion of sub-bituminous coal from the Powder River Basin 1 to 14 parts sulfate surfactant foam, 0 to 6 parts accelerator which is extract of silica fume dust, and 0–30 parts additive selected from the group consisting of magnesium and boron compounds, class F fly ash, incinerated sewage sludge, diatomaceous earth, fullers earth, kaolin, kiln dust, perlite, pyrophyllite, talc, ground vermiculite, ground polyethylene, cement, and magnesium silicate.

2. The light-weight aggregate of claim 1 wherein said sulfate surfactant is selected from the group consisting of ammonium alkyl ether sulfate, ammonium salts of ethoxylate sulfate, calcium alkylaryl sulfonate, ammonium lauryl sulfate, monoethanolamine lauryl sulfate diethanolamine lauryl sulfate, triethanolamine lauryl sulfate, isopropanolamine lauryl sulfate, ammonium lauryl ether sulfate, diethanolamine lauryl ether sulfate, isopropylamine salt of alkyl benzene sulfonic acid, amine or ammonium salts of dodecyl benzene sulfonic acid, ammonium salts of oxidized oleic acid, ammonium salts of sulfated nonyl-phenol ethoxylate, calcium dodecyl benzene sulfonate, ammonium myristyl ether sulfate, ammonium myristyl sulfate, triamine lauryl sulfate, alkanol amino lauryl sulfate, acyl amino polyglycol ether sulfate.

3. The light-weight aggregate of claim 1 wherein said sulfate surfactant is an ammonium salt of dodecyl benzene sulfonic acid.

4. The light-weight aggregate of claim 1 wherein said sulfate surfactant also contains a non-wetting agent selected from the group consisting of glycerin and mineral oil.

5. The light-weight aggregate of claim 1 wherein said extract of silica fume dust is prepared by mixing silica fume dust with water, raising the PH to between approximately 10–12, settling and collecting the resulting supernatant.

6. A light-weight structural composition comprising a pozzolanic material, water, and a light-weight aggregate consisting of a pellitized agglomerated mixture of by wegiht to 50 to 86 parts self-hardening fly ash formed in the combustion of sub-bituminous coal from the Powder River Basin, 1 to 14 parts sulfate surfactant foam, 0 to 6 parts accelerator which is an extract of silica fume dust, and 0 to 30 parts additive selected from the group consisting of magnesium and boron compounds, class F fly ash, incinerated sewage sludge, diatomaceous earth, fullers earth, kaolin, kiln dust, perlite, pyrophyllite, talc, ground vermiculite, ground polyethylene, cement, and magnesium silicate.

7. A method for producing light-weight aggregate particles comprising the steps of:
preparing a sulfate surfactant foam,
mixing said surfactant foam, and a self-hardening fly ash to form a pelletized agglomerated mixture, and hardening said pelletized agglomerated mixture.

8. The method of claim 7 further including the step of adding an extract of silica fume dust accelerator.

9. The method of claim 8 wherein said extract of silica fume dust accelerator is prepared by mixing silica fume dust with water, raising the pH to between approximately 10–12, settling and collecting the resulting supernatant.

10. The method of claim 7 further including the step of adding an additive selected from the group consisting of magnesium and boron compounds, class F fly ash, incinerated sewage sludge, diatomaceous earth, fullers earth, kaolin, kiln dust, perlite, pyrophyllite, talc, ground vermiculite, ground polyethylene, cement, and magnesium silicate.

11. The method of claim 7 wherein said surfactant foam is prepared by introducing air under pressure into a mixture of a sulfate surfactant and a non-wetting agent.

12. The method of claim 11 wherein said sulfate surfactant is selected from the group consisting of ammonium alkyl ether sulfate, ammonium salts of ethoxylate sulfate, calcium alkylaryl sulfonate, ammonium lauryl sulfate, monoethanolamine lauryl sulfate diethanolamine lauryl sulfate, triethanolamine lauryl sulfate, isopropanolamine lauryl sulfate, ammonium lauryl ether sulfate, diethanolamine lauryl ether sulfate, isopropylamine salt of alkyl benzene sulfonic acid, amine or ammonium salts of dodecyl benzene sulfonic acid, ammonium salts of oxidized oleic acid, ammonium salts of sulfated nonyl-phenol ethoxylate, calcium dodecyl benzene sulfonate, ammonium myristyl ether sulfate, ammonium myristyl sulfate, triamine lauryl sulfate, alkanol amino lauryl sulfate, acyl amino polyglycol ether sulfate.

13. The method of claim 12 said non-wetting agent is selected from the group consisting of glycerin and mineral oil.

14. The method of claim 11 wherein an extract of silica fume dust accelerator is mixed with said sulfate surfactant and said non-wetting agent prior to the introduction of said air under pressure.

15. The method of claim 7 where said mixing is conducted in a disk agglomerator to form said pelletized agglomerated mixture which is hardened to form said light-weight aggregate particles.

16. An accelerator for use in accelerating the hardening of pozzolanic materials comprising an extract of silica fume dust prepared by mixing silica fume dust with water, raising the pH to between 10–12, settling and collecting the resulting supernatant.

* * * * *